United States Patent [19]

Motyka

[11] Patent Number: 4,850,132
[45] Date of Patent: Jul. 25, 1989

[54] FISHING RIG

[76] Inventor: Peter Motyka, 6505 Byrnes Dr., McLean, Va. 22101

[21] Appl. No.: 197,108

[22] Filed: May 23, 1988

Related U.S. Application Data

[63] Continuation-in-part of Ser. No. 95,394, Sep. 10, 1987, abandoned.

[51] Int. Cl.⁴ .............................................. A01K 83/06
[52] U.S. Cl. ...................................................... 43/44.2
[58] Field of Search .................... 43/44.2, 44.81, 44.82, 43/44.96, 42.39

[56] References Cited

U.S. PATENT DOCUMENTS

| | | | |
|---|---|---|---|
| 3,465,466 | 8/1969 | Showalter | 43/44.8 |
| 3,624,950 | 12/1971 | Merckes | 43/44.2 |
| 3,760,525 | 8/1973 | Daughtry | 43/44.2 |
| 3,839,814 | 10/1974 | Sykora | 43/44.2 |
| 3,905,149 | 9/1975 | McCloud | 43/44.2 |
| 3,940,870 | 3/1976 | Petterson | 43/44.2 |

FOREIGN PATENT DOCUMENTS

| | | | |
|---|---|---|---|
| 445749 | 5/1927 | Fed. Rep. of Germany | 43/44.2 |
| 243801 | 2/1947 | Switzerland | 43/44.2 |
| 466605 | 7/1937 | United Kingdom | 43/44.2 |
| 666742 | 2/1952 | United Kingdom | 43/44.2 |

*Primary Examiner*—Kenneth J. Ramsey
*Assistant Examiner*—Karen Skillman
*Attorney, Agent, or Firm*—Lowe, Price, LeBlanc, Becker & Shur

[57] ABSTRACT

A device for fishing with a dead or live minnow includes a gorge engaging member formed with outwardly extending projections. In use, the member is inserted into the minnow's mouth and secured to a fishing line by means of an eyelet portion formed in a forward end of the member. Pulling force acting upon the fishing rig during trolling, casting, or jigging acts to partially embed the projections within the minnow's mouth to resist withdrawal therefrom. One or more fish hooks may be secured to the eyelet portion for subsequent attachment to the minnow proximate the dorsal fin and/or tail.

3 Claims, 23 Drawing Sheets

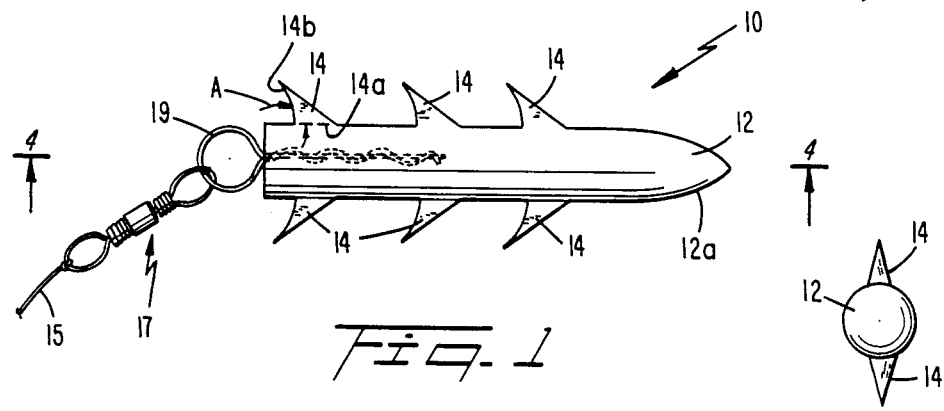
Fig. 1
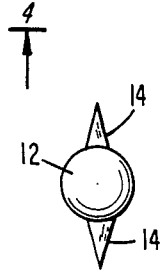
Fig. 2
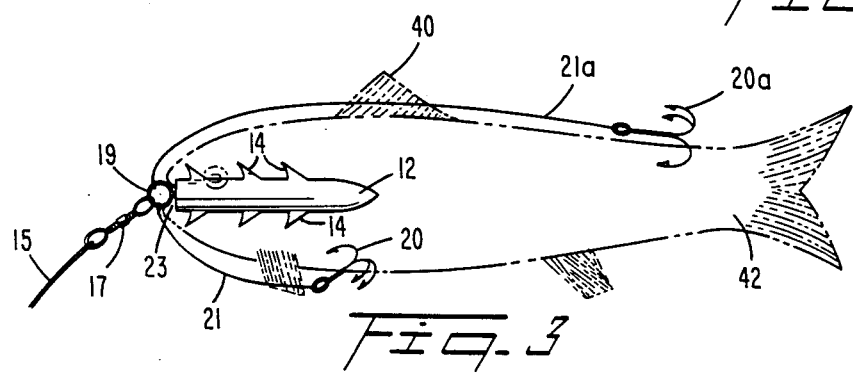
Fig. 3
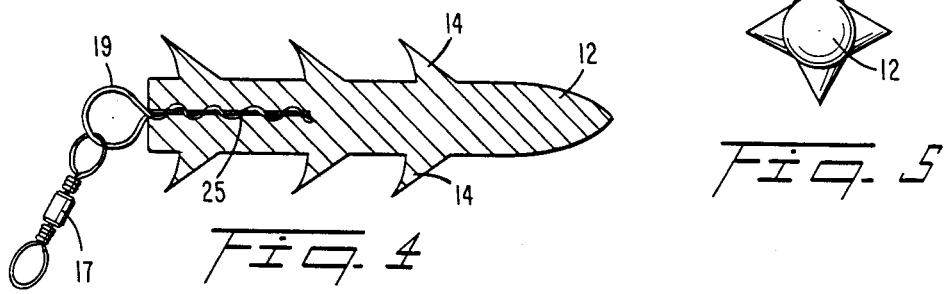
Fig. 4
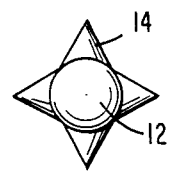
Fig. 5
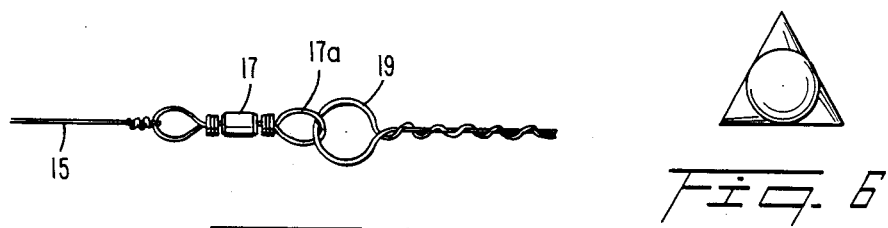
Fig. 7
Fig. 6

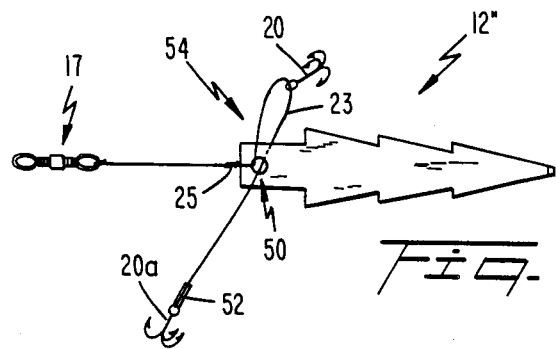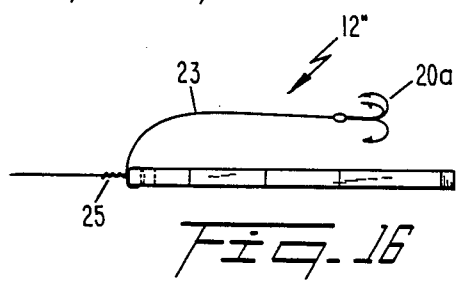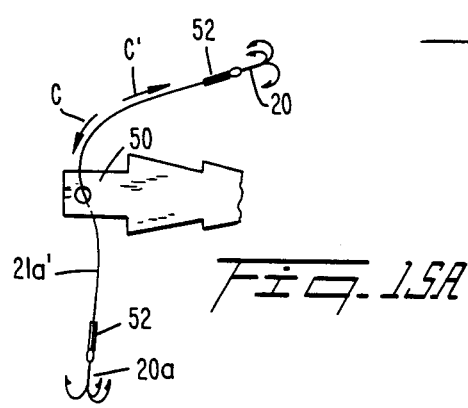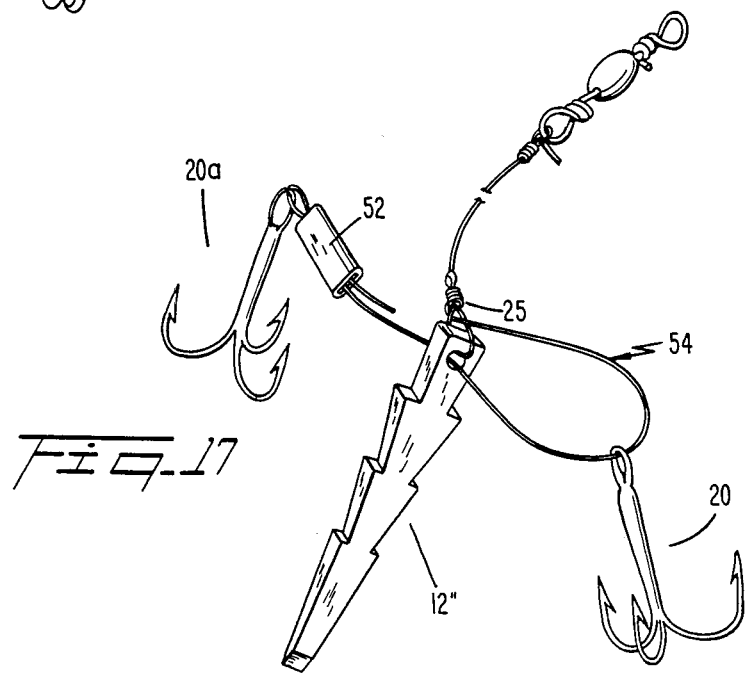

FISHING RIG

This application is a continuation-in-part of application Ser. No. 95,394, filed Sept. 10, 1987 now abandoned.

TECHNICAL FIELD

The present invention relates to fishing rigs and, more particularly, to a fishing rig utilizing a minnow as fishing bait.

BACKGROUND ART

Dead minnows are often used as fishing bait to catch trout, bass, walleyes and other types of game fish normally found in fresh water. Traditionally, one or more hooks would be rigged to the minnow by passing the hook through the mouth of the minnow, tail or dorsal fin with the hooks connected to each other with fishing line secured to leader material. A sinker tied to the fishing line in spaced relationship to the rigged minnow would then be used to sink the minnow to a desired depth for use in casting, jigging and trolling.

One problem associated with the aforementioned fishing rig is the difficulty associated with rigging the hooks together with the sinker. A further problem is that the sinker spaced from the minnow tends to exert a lateral force that detracts from a lifelike appearance of the minnow when it is used as a bait in trolling or jigging.

U.S. Pat. No. 3,839,814 to Sykora discloses a device for fishing with a dead minnow comprising a cylindrical gorge engaging member in the form of a lead weight attached to a bait frame. This frame is a three sided wire member having a substantially straight horizontal bottom arm, a curved top arm integral with a forward end of the bottom arm and a substantially vertical arm releasably engageable with a top curved arm. In use, the dead minnow is fixed to the device by inserting the gorge engaging weight in the mouth of the minnow and passing the vertical part of the frame completely through the minnow (piercing the belly and dorsal fin) so that it may reengage the top curved frame member. The top and bottom of frame members extend along and outside the minnow with a forward hook secured to the top member inserted into the dorsal fin and a rear hook secured to an upper portion of a minnow between the dorsal fin and tail.

The foregoing device disclosed in the '814 patent constitutes an improvement to the prior art fishing rig and sinker since the gorge engaging member functions as a sinker and thereby eliminates the use of a separate sinker which would otherwise detract from the lifelike appearance of the minnow drawn through the water. However, one disadvantage of the Sykora device is that it is relatively complicated to manufacture in view of its requirement of a wire frame of complex shape. Another problem associated with the Sykora device is that the top and bottom wire arms extend along the minnow and tend to detract from its lifelike appearance.

A further problem associated with the Sykora device is that it is necessary to insert the cross arm through the body of the dead minnow so as to secure the cross arm to the top arm. Insertion of the cross arm through the dead minnows body may be messy and may also possibly distort the body, detracting from the lifelike appearance.

It is often desirable to fish with live minnows. However, since the Sykora device requires the cross arm to be inserted through the minnow's body, that device is necessarily limited to use with a dead minnow.

It is accordingly an object of the present invention to provide a device that facilitates the use of a dead minnow as a fishing bait, but that may also be used with a live minnow as a fishing bait.

Another object of the invention is to provide a device to which a dead minnow may be affixed with the minnow having a lifelike appearance when used as a bait in jigging, trolling, or casting.

Another object is to provide a fishing rig to which a dead or live minnow may be affixed, with the device being provided with a plurality of hooks attached thereto and in which one of the hooks may be fixed directly to the tail section of the minnow to prevent short strikes.

Yet another object is to provide a fishing rig in which the rig is provided with an integral weight inserted into the dead or live minnows mouth, thus eliminating the need for a separate weight or sinker and thus enhancing or not detracting from the lifelike appearance of the minnow.

Still a further object is to provide a fishing rig providing the aforementioned objects without the use of a frame having portions extending outside the minnow which detract from its lifelike appearance.

Still a further object is to provide a fishing rig having improved means for maintaining the integral weight within the minnows mouth without requiring a frame or frame portions extending through the minnow.

SUMMARY OF THE INVENTION

A fishing rig for use with a dead or live minnow, in accordance with the present invention, comprises a gorge engaging member formed with at least one projection extending laterally therefrom and at least one fish hook connected to the member. A leader attaching portion extends from a forward end of the member to facilitate securement of a leader or fishing line directly to the rig. In accordance with the invention at least one projection extends laterally from the gorge engaging member. The projection is operable to engage and at least partially embed within interior portions of the minnow upon insertion of the member into the minnow's mouth. The projection cooperates with the gorge engaging member by wedging the member within the minnow's mouth to resist withdrawal occasioned by pulling forces acting on the minnow from the fishing line.

Preferably, the member is generally cylindrical with a tapered trailing end to facilitate its insertion into the minnow's mouth. The member is advantageously made from material of sufficient mass to act as a sinker. However, it is within the scope of this invention to form the gorge engaging member from lightweight material, such as plastic and which would not function as a sinker A swivel is preferably provided between the leader attaching means and the fishing line or leader material to resist rotation of the member to prevent line twisting.

In accordance with a preferred embodiment of the invention, a plurality of projections extend laterally from the gorge engaging member, with each projection terminating in a point. The projections are longitudinally spaced from each other along the gorge engaging member and may be further formed as diametrically opposed pairs integral with the member. Projections are preferably of unitary construction with the member, particularly when formed from molten metal material (e.g., lead) within a mold.

Each projection may be triangular shaped having an imaginary longitudinal base leg coincident with the surface of the cylindrical portion of the member and an altitude leg facing in the forward direction of the member towards the leader attaching means. The altitude leg forms an obtuse angle with the base leg. The projections are thus slanted in the forward direction to have a barb-like effect preventing withdrawal of the gorge engaging member from the minnow's mouth.

Leader attaching means may include wire means embedded within the member and may also include an eyelet projecting forwardly from the member and immediately adjacent thereto. A swivel may be attached to the eyelet. A forward treble hook may be connected to the eyelet portion by a first wire of sufficient length to enable the hook to be affixed proximate the dorsal fin of the minnow The fishing rig may also be provided with a rear treble hook connected to the eyelet portion by a second wire of sufficient length to enable the rear treble hook to be affixed proximate the minnow's tail. The forward and trailing hooks may advantageously be used in combination, or individually. Since trout tend to strike a minnow's tail, it is advantageous to position at least one hook in the tail in the aforesaid manner when trout fishing. As bass tend to grab the minnow's head, it is advantageous to utilize the fishing rig of the present invention with a hook secured to the dorsal fin.

In an alternative preferred embodiment of the present invention, the pair of hooks which may also be single hooks are respectively fixed to the opposite ends of a single length of fishing wire or line. This piece of fishing wire or line passes through the eyelet of the member or through the eyelet portion of a swivel fixed directly to the member eyelet. With this arrangement, the relative spacing between the hooks in relation to the longitudinal axis of the member may be easily adjustably varied by moving the connecting line through the eyelet. In this manner, the placement of forward and trailing hooks may be 'tailored' to the size of the minnow.

The gorge engaging member of the present invention, in accordance with a second embodiment of the invention, may be formed with a wire folded once along its length to define a generally circular eyelet portion and a pair of substantially parallel and generally straight wire portions projecting rearwardly from the eyelet portion wherein one or both ends of the straight wire portions are folded in the direction of the eyelet portion to define an anchoring portion embedded within the gorge engaging member. Embedment of the parallel wire portions and rear anchoring portion within the body of the gorge engaging member prevents withdrawal form the member or undesirable movement of the eyelet portion.

The gorge engaging member, in accordance with another embodiment of the invention, comprises a gorge engaging member integrally formed with an eyelet portion at the front end thereof. In this embodiment, and because lead is a highly malleable metal, it is preferred to form the gorge engaging member with integral eyelet from plastic or a lightweight material (e.g., aluminum or magnesium) having the necessary strength characteristics to avoid deformation of the eyelet during fishing, i.e., to define the 'pulling point', although it is to be understood that lead may be used. In this embodiment, the gorge engaging member is lightweight and therefore preferably used for drifting. The swivel is secured to the integral eyelet by means of length of fishing line and is spaced forwardly from the gorge engaging member (and therefore the minnow) to minimize the amount of fishing tackle hardware. The pair of fishing hooks connected to each other by a length of fishing line or wire passing loosely through the integral eyelet allows the spacing of each hook relative to the eyelet to be adjusted to accommodate minnows of virtually any size.

The fishing hooks may be secured to the adjusting wire with either conventional knots or connector sleeves crimped to double over end portions of the fishing wire.

In a modification of the gorge engaging member described in the two immediately preceding paragraphs, the gorge engaging member is made of lead and the hooks are adjustably secured to each other by first passing the eyelet of one hook through the terminal end of the fishing line located downstream from the knot securing the line to the eyelet portion of the gorge engaging member, and then passing the fishing line end through the eyelet portion of the gorge engaging member for subsequent attachment to the rear hook. In this manner, a loop is formed between the first or forward fishing hook and the body of the gorge engaging member. The loop is advantageously adjustable in size by pulling on the end of the fishing line passing through the eyelet portion so as to control and vary the longitudinal distance or spacing between both hooks relative to each other and the eyelet portion.

The novel features which are characteristic of the present invention and other objects and advantages thereof, will be better understood from the following detailed description and the accompanying drawings which together disclose the presently preferred embodiment of the invention.

BRIEF DESCRIPTION OF THE DRAWINGS

FIG. 1 is a side elevational view of a preferred embodiment of the fishing rig of the present invention;

FIG. 2 is a rear view of the fishing rig shown in FIG. 1;

FIG. 3 is a perspective view of the fishing rig of FIG. 1 rigged to a minnow;

FIG. 4 is a sectional view taken along the line 4—4 of FIG. 1 to depict one embodiment of the anchoring projections;

FIG. 5 is a second embodiment of the anchoring projections;

FIG. 6 is a third embodiment of the anchoring projections; and

FIG. 7 is a detailed view of a preferred embodiment of leader attaching means of the invention.

FIG. 15 is a plane view of a third embodiment of a gorge engaging member according to the present invention in conjunction with an adjustable hook arrangement usable with any of the embodiments of the present invention;

FIG. 15A is a modification of the FIG. 16 embodiment; and

FIG. 16 is a side view of FIG. 15.

FIG. 17 is a perspective view of the FIG. 15 embodiment.

BEST MODE FOR CARRYING OUT THE INVENTION

Figure 8:
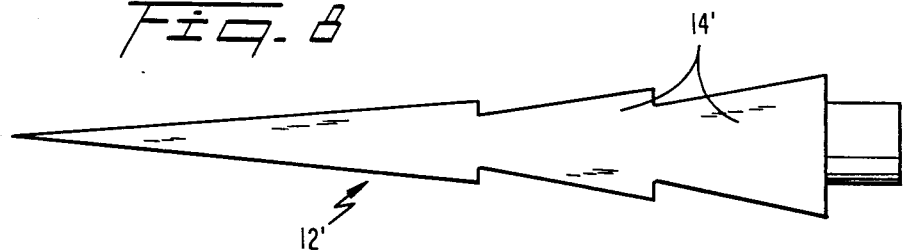
FIG. 8 is a plan view in scale drawing of an alternative embodiment of a gorge engaging member according to the present invention.

Reference is now made to the preferred embodiment of the present invention, an example of which is illustrated in the accompanying drawing. In FIG. 1, fishing rig 10 in accordance with the invention comprises a gorge engaging member 12 having projections 14 extending outwardly therefrom and connected to a fishing line 15 through swivel 17 fixed to an eyelet 19 projecting forwardly from the gorge engaging member with an anchoring portion 19a of the eyelet embedded within the member as discussed infra. At least one fishing hook 20 is secured to the swivel 17 or the eyelet 19 by means of line 21 as shown in FIG. 3. In use, gorge engaging member 12 is inserted into the minnow's throat through mouth 23 and hooks 20 are thereupon secured to the belly, dorsal fin and/or tail of the minnow in a customary manner. Thusly rigged, the minnow may be cast, jigged or trolled. A pulling force exerted by the fisherman through a fishing rod (not shown) and line 15 acts upon the minnow through fishing rig 10. The projections 14 advantageously resist withdrawal of the gorge engaging member 12 from the minnow's mouth since the pulling force tends to further embed the projections within interior portions of the minnow's mouth to thereby resist withdrawal.

The gorge engaging member 12 is preferably formed of a moldable material such as metal (e.g., lead) when the member is used as a weight, or plastic when it is desired to employ fishing rig 10 for drifting minnows in shallow water. The projections 14 are thereby integrally cast with the member 12. Appropriately shaped mold cavities (not shown) are employed in a well-known manner to receive the molten plastic or metal to form the gorge engaging members 12. In the forming process, a length of twisted wire 25 formed with eyelet portion 19 is positioned along the longitudinal axis of gorge engaging member 12 to provide a secure anchoring means for securing the fishing line 15 to fishing rig 10, either directly to the eyelet portion or through the swivel 17.

Gorge engaging member 12 is preferably generally cylindrically shaped with a tapered rear end 12a for easy insertion into the minnow's mouth as shown in FIG. 3. Each projection 14 is preferably triangularly shaped having an imaginary longitudinal base leg 14a coincident with the cylindrical surface of the member 12 and an altitude leg 14b facing in the forward direction of the member towards the swivel 17. The altitude leg 14b preferably forms an obtuse angle A with the base leg 14a. The projections 14 are thus slanted in the forward direction to have a barb-like effect preventing withdrawal of the gorge engaging member 12 from the minnow's mouth.

With reference to FIG. 4, the projections 14 are preferably formed in diametrically opposed pairs longitudinally spaced from each other along the forward portion of the member 12. However, as shown in FIG. 5, the projections 14 may also be formed as two sets of diametrically opposed pairs of individual projections 14 longitudinally spaced along the gorge engaging member 12. Although desirable, it is not necessary that each projection 14 be triangular shaped in the manner described above and that the projections may take other forms (e.g., spike shaped) so long as they act to prevent withdrawal of the gorge engaging member 12 from the minnow's mouth. Triangular shaped projections 14 are preferred as they tend to be rugged in design and therefore capable of reliable operation to resist withdrawal of fishing rig 10 from the minnow's mouth, particularly in strong currents or extensive jigging activity.

FIG. 6 is an illustration of an alternative form of gorge engaging member 12 depicted generally as a triangular shaped member in cross-section.

The leader attaching means as discussed briefly above. is preferably a length of twisted wire 25, such as wire fishing line, that is doubled over itself to form the eyelet portion 19 and then twisted along its remaining doubled over length portions to present a rough appearance (FIG. 7) providing a secure anchoring connection when embedded within the molded material forming gorge engaging member 12. The eyelet portion 19 projects forwardly from the member 12 and may be secured to the fishing line 15 by means of a conventional swivel 17. Preferably, one end 17a of the swivel 17 is threaded through the wire 25 during initial forming of the eyelet portion 19. Although a snap swivel (not shown) may be secured directly to the eyelet portion 19, the swivel depicted in FIG. 1 is preferred to provide a minimum of fishing tackle hardware so that the minnow can present a somewhat life like appearance.

A forward treble hook 20 may be connected to the eyelet portion 19 by a first wire of 21 predetermined length sufficient to enable the hook to be fixed proximate to the dorsal fin 40 of the minnow (not shown) or, more advantageously, to the minnow's belly (FIG. 3) so that the weight is evenly distributed and the minnow does not roll over into an unnatural position. If desired, the fishing rig 10 may also be formed with a rear treble hook 20a connected to the eyelet portion 19 by a second wire 21a of length sufficient to enable the rear hook to be fixed proximate the minnow's tail 42. The forward and rear hooks 20,20a may be advantageously used in combination, or individually. For example, since trout tend to strike a minnow's tail, it is advantageous to position at least one hook in the tail in the aforesaid manner when trout fishing. As bass tend to grab the minnow's head, it is advantageous to utilize the fishing rig of the present invention with a hook secured to the belly or dorsal fin. The first and second wires 21,21a may be fishing line (e.g , nylon) or may be braided coated wire such as when fishing for toothed predators such as pike, walleyes, bass, etc.

Fishing rig 10 of the invention provides an effective means for fishing with either a dead or live minnow since gorge engaging member 12 is securely fixed within the minnow's mouth without the need of wire members passing through the minnow's body as in the prior art discussed supra. By forming the fishing rig 10 with the projections 14 in the manner described above, the minnow may be jigged, trolled or casted without detracting from the life-like appearance and while remaining reliably secured to the fishing line. The placement of hooks (preferably treble) in the manner described above provides an effective means for securing a hook directly to the tail section of the minnow to prevent short strikes. Advantageously, the hooks are not directly subjected to the pulling force exerted during jigging, trolling or casting since the pulling point acts upon the eyelet portion 19 and is transmitted to the projections 14 as described above.

Figure 9:
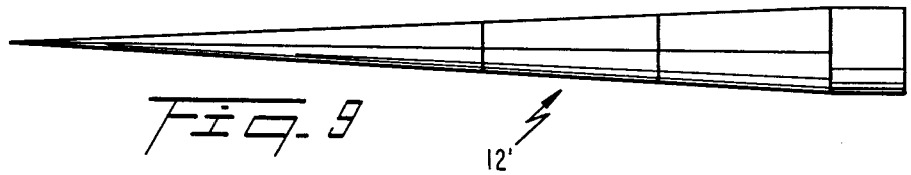
FIG. 9 is a side elevational view of the FIG. 8 embodiment.
Figure 10:
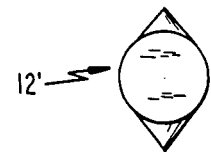
FIG. 10 is an end view of the FIG. 8 embodiment.

FIGS. 8–10 are illustrations of a second embodiment of a gorge engaging member 12' that is functionally similar to the gorge engaging member 12 described supra. However, the gorge engaging member 12' is formed as a series of trapezoidal shaped projection 14' positioned end to end with the smaller base of a given projection being collinear with the larger base of its forwardly adjacent barb. The rearwardmost barb has the shape of an isosceles triangle with a base substantially equal in length to the largest base of the barb shaped trapezoids.

The member 12' is an engineering scaled drawing and the member 12' may be casted from molten material, die cut and/or stamped, etc.

Figure 11:
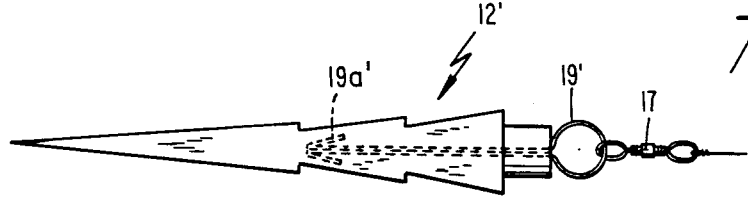
FIG. 11 is a plan view of the FIG. 8 embodiment in conjunction with an alternative form of wire defining an eyelet of the gorge engaging member.
Figure 12:
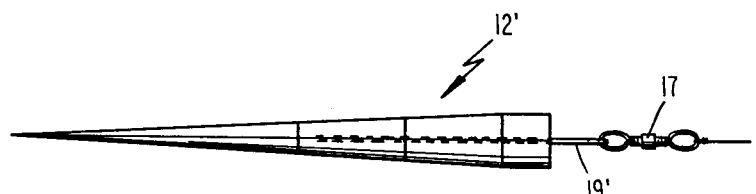
FIG. 12 is a side view of the FIG. 11 embodiment.
Figure 14:
FIG. 14 is an end view of the FIG. 11 embodiment.
Figure 13:
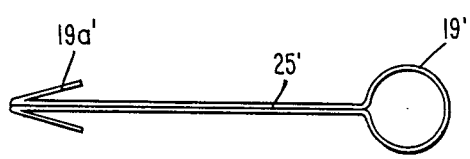
FIG. 13 is a plan view of the alternate form of wire depicted in FIG. 11.

The gorge engaging member 12' of FIGS. 8–10 is depicted in FIGS. 11–14 in conjunction with a wire 25' formed with an eyelet portion 19' in accordance with an alternative embodiment of wire 25/eyelet 19 discussed supra. The wire 25' is doubled over itself to form the circular eyelet portion 19'. However, instead of then twisting the doubled over length portions to present a rough appearance as in the first embodiment, it has been found that a reliable anchoring portion 19a' may be formed by twisting one or both of the rear wire ends back towards the eyelet portion 19' as depicted in FIGS. 11 and 13.

FIG. 15 is an illustrations of a third embodiment of a gorge engaging member wherein the member 12" may be as depicted in FIGS. 8–10 but formed with an integral eyelet portion 50 in place of either wire 25 or 25'. Member 12" is preferably of uniform thickness along its length for ease of manufacture, i.e., member 12" may be stamped from flat sheet material such as lead sheet. The FIG. 15 embodiment is preferably made of plastic or a metal having sufficient strength to establish the eyelet portion 50 defining the pulling point subjected to the pulling force exerted during jigging, trolling, casting, etc.

Although the member 12" may be formed of a metal such as aluminum having the necessary strength characteristics to define the pulling point eyelet portion 50, it is preferred to form the member 12" from plastic so that it is lightweight and can be used for drifting without a wire 25 or 25' tending to add unnecessary weight. When used for drifting, the swivel 17 may be spaced from the member 12" by a length of fishing line to minimize the amount of fishing tackle proximate the minnow. Of course, member 12" may also be lead.

In accordance with a preferred feature of the present invention, hooks 20 and 20a are preferably secured to each other by first passing the eyelet of hook 20 through the terminal end 23 (located downstream from knot 25) of the fishing line and then passing the end 23 through the eyelet portion 50 for subsequent attachment of hook 20a to the end 23 with, for example, connector sleeve 52. This manner of hook attachment creates a loop 54 which is advantageously adjustable in size by pulling on line 23, proximate hook 20a, to control and vary the longitudinal distance (i.e., effective length) or spacing between both hooks 20,20a relative to each other and eyelet portion 50, i.e., for proper hook attachment to minnows of different size.

In a modification of the FIG. 15 embodiment, only hook 20a is present at the terminal end of line 23 for attachment to the minnow's tail. The line 23 need not be passed through eyelet portion 50 to create loop 54.

In the embodiments of FIGS. 15 and 15A, the gorge engaging member 12" may be lead. Although it is possible that the eyelet portion 50 may deform if subjected to excessive pulling force, it should be appreciated that in the FIG. 15 embodiment of the invention, the hooks 20 and 20a will remain with the fishing line as a result of being tied directly thereto.

In accordance with another feature of the present invention, hooks 20 and 20a are secured to each other by a length of fishing line 21a" that passes freely through the eyelet portion 19 or 19' or the integral eyelet portion 50 of FIG. 15. In this manner, the effective length of each hook 20 and 20a may be adjusted, in relation to the eyelet portion 50 by moving the line 21a' in the direction C or C'. When moved in the direction C, the forward hook 20 moves closer to the eyelet portion 50 while the rear hook 20a moves a like distance in the rearward direction. When moving the line 21a' in the direction C', the rear hook 20a moves closer to the eyelet portion 50 while the front hook 20 moves a like distance in the rearward direction. Although opposite ends of line 21a' may be tied to the hooks 20,20a, respectively, conventional connector sleeves 52 may be crimped to the opposite ends of the line (after they have passed through the hook eyelets).

The present invention has been shown and described herein in what is considered to be the most practicable and preferred embodiment. It is recognized, however, that departures may be made therefrom within the scope of the invention and that obvious modifications will occur to one skilled in the art.

What is claimed is:

1. A fishing ring comprising a gorge engaging member formed with at least one projection extending laterally therefrom, said fishing rig further comprising:
   means for connecting at least two fish hooks to said member;
   fishing line attaching means extending from a forward end of said member, said at least one projection being operable to engage and at least partially embed within interior portions of a minnow upon insertion of said member into the mouth of the minnow to thereby resist withdrawal of said member from the mouth, wherein said fishing line attaching means includes an eyelet portion formed in said gorge engaging member and wherein said connecting means includes at least a pair of said fishing hooks connected to each other by a terminal end of a fishing line extending downstream from a knot securing the fishing line to the eyelet portion, by first passing an eyelet of one fishing hook through the terminal end and then passing the terminal end of the said fishing line through the eyelet portion to define an adjustable loop on a first side of the gorge engaging member and the second hook is attached to the terminal end of the fishing line on a second side of the member located opposite the first side.

2. The fishing rig of claim 1, wherein said gorge engaging member has substantially uniform thickness substantially its entire length.

3. The fishing rig of claim 2, wherein said gorge engaging member is die stamped from sheet metal material.

* * * * *